United States Patent
Belnap

(10) Patent No.: US 10,077,608 B2
(45) Date of Patent: Sep. 18, 2018

(54) THERMALLY STABLE MATERIALS, CUTTER ELEMENTS WITH SUCH THERMALLY STABLE MATERIALS, AND METHODS OF FORMING THE SAME

(71) Applicant: Smith International, Inc., Houston, TX (US)

(72) Inventor: J. Daniel Belnap, Lindon, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 691 days.

(21) Appl. No.: 13/717,116

(22) Filed: Dec. 17, 2012

(65) Prior Publication Data

US 2013/0264124 A1    Oct. 10, 2013

Related U.S. Application Data

(60) Provisional application No. 61/581,843, filed on Dec. 30, 2011.

(51) Int. Cl.
*E21B 10/567* (2006.01)
*B01J 3/06* (2006.01)
*B24D 18/00* (2006.01)
*B24D 3/00* (2006.01)

(52) U.S. Cl.
CPC ............ *E21B 10/567* (2013.01); *B01J 3/06* (2013.01); *B24D 3/00* (2013.01); *B24D 18/00* (2013.01)

(58) Field of Classification Search
CPC .. B24D 3/00; B24D 18/00; C09K 3/14; E21B 10/00; E21B 10/46; E21B 10/55; B23B 27/20; B01J 3/00; B01J 3/06; B22F 3/00
See application file for complete search history.

(56) References Cited

U.S. PATENT DOCUMENTS

| | | |
|---|---|---|
| 4,224,380 A | 9/1980 | Bovenkerk et al. |
| 4,931,363 A | 6/1990 | Slutz et al. |
| 5,011,514 A | 4/1991 | Cho et al. |
| 5,759,216 A | 6/1998 | Kanada et al. |
| 6,248,447 B1 | 6/2001 | Griffin et al. |
| 7,261,753 B2 | 8/2007 | Yamamoto et al. |
| 7,462,003 B2 | 12/2008 | Middlemiss |

(Continued)

FOREIGN PATENT DOCUMENTS

EP      0699642      3/1996

OTHER PUBLICATIONS

Sumiya, Hitoshi and Irifune, Tesuo. "Synthesis of High-Purity Nano-Polycrystalline Diamond and its Characterization". Jan. 2005, vol. 59 SEI Technical Review.*

(Continued)

*Primary Examiner* — Kaj K Olsen
*Assistant Examiner* — Alexandra Marie Moore

(57) ABSTRACT

A thermally stable ultra-hard material, a cutting element incorporating such thermally stable ultra-hard material, and methods for forming the same. A thermally stable ultra-hard diamond element is combined with a second ultra-hard material volume forming an assembly. One or more surfaces of the thermally stable diamond element that face the second diamond volume are coated with a coating prior to combining the thermally stable diamond element with the second diamond volume. The assembly is sintered at high pressure and high temperature to form PCD from the second diamond volume.

16 Claims, 6 Drawing Sheets

(56) References Cited

U.S. PATENT DOCUMENTS

| | | | |
|---|---|---|---|
| 7,621,974 | B2 | 11/2009 | Yamamoto et al. |
| 8,028,771 | B2 | 10/2011 | Keshavan et al. |
| 8,057,562 | B2 | 11/2011 | Middlemiss et al. |
| 8,061,454 | B2 | 11/2011 | Voronin et al. |
| 2006/0254830 | A1 | 11/2006 | Radtke |
| 2008/0073126 | A1 | 3/2008 | Shen et al. |
| 2008/0085407 | A1 | 4/2008 | Cooley et al. |
| 2008/0202814 | A1* | 8/2008 | Lyons ............... E21B 10/50 175/61 |
| 2009/0095538 | A1 | 4/2009 | Middlemiss |
| 2009/0313908 | A1 | 12/2009 | Zhang et al. |
| 2010/0084197 | A1 | 4/2010 | Voronin et al. |
| 2010/0326740 | A1 | 12/2010 | Hall et al. |
| 2011/0036643 | A1 | 2/2011 | Belnap et al. |
| 2011/0083908 | A1 | 4/2011 | Shen et al. |
| 2011/0083909 | A1 | 4/2011 | Shen et al. |
| 2011/0132666 | A1 | 6/2011 | DiGiovanni et al. |

OTHER PUBLICATIONS

Creese, Robert. "Introduction to Manufacturing Processes and Materials" p. 30 of 416. CRC Press 1999 IBSN 9780824799144.*
International Search Report and Written Opinion of PCT Application No. PCT/US2012/070697 dated Apr. 16, 2013: pp. 1-13.

* cited by examiner

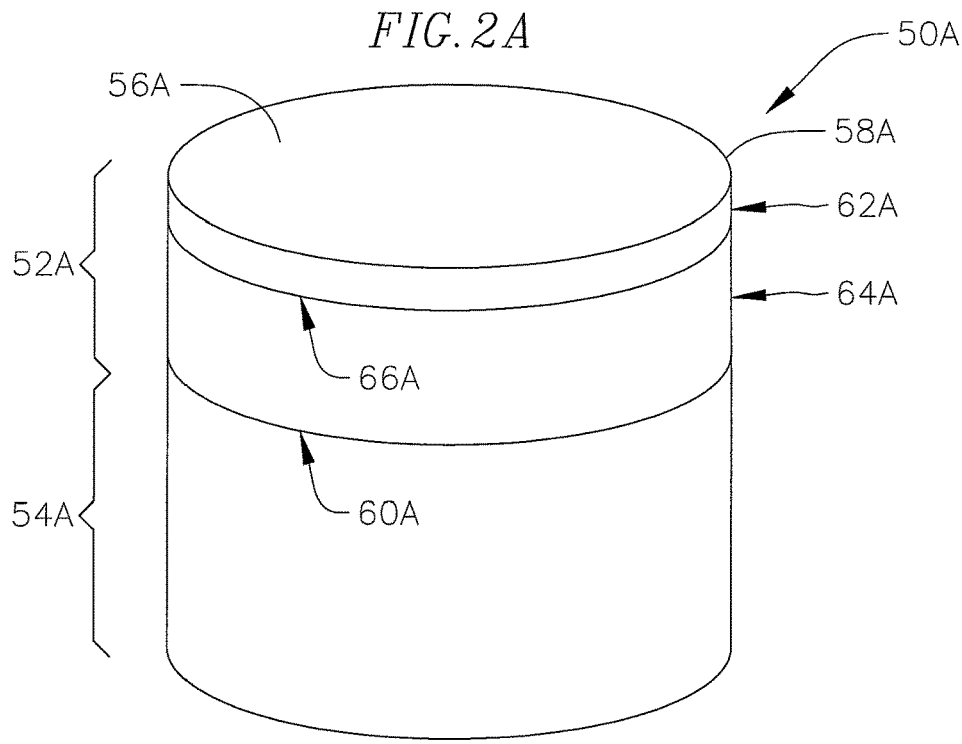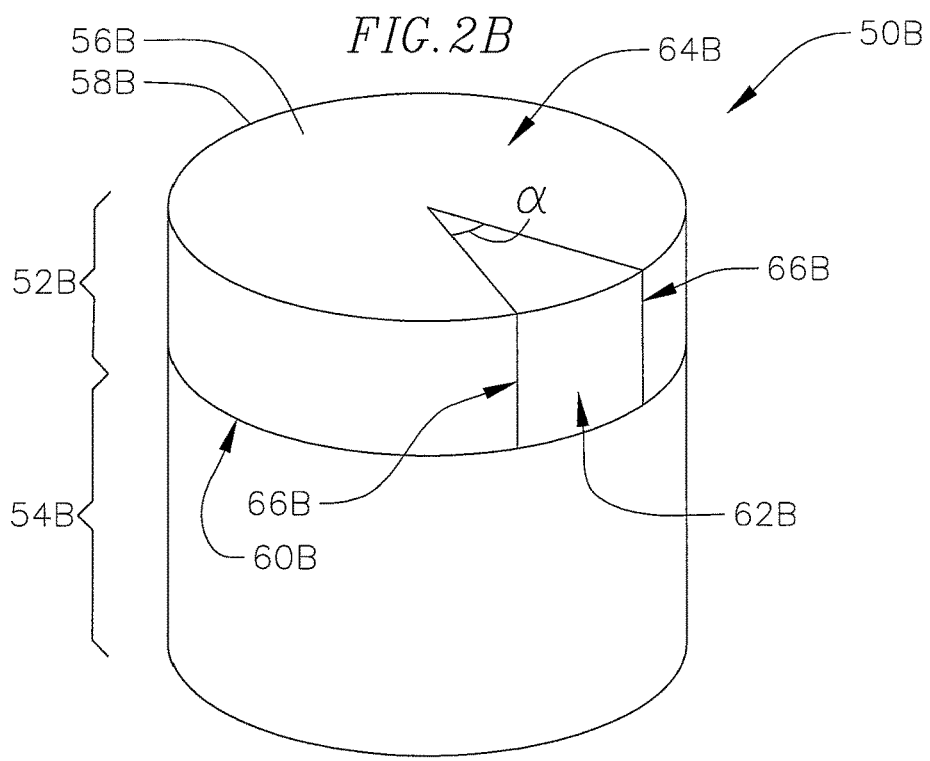

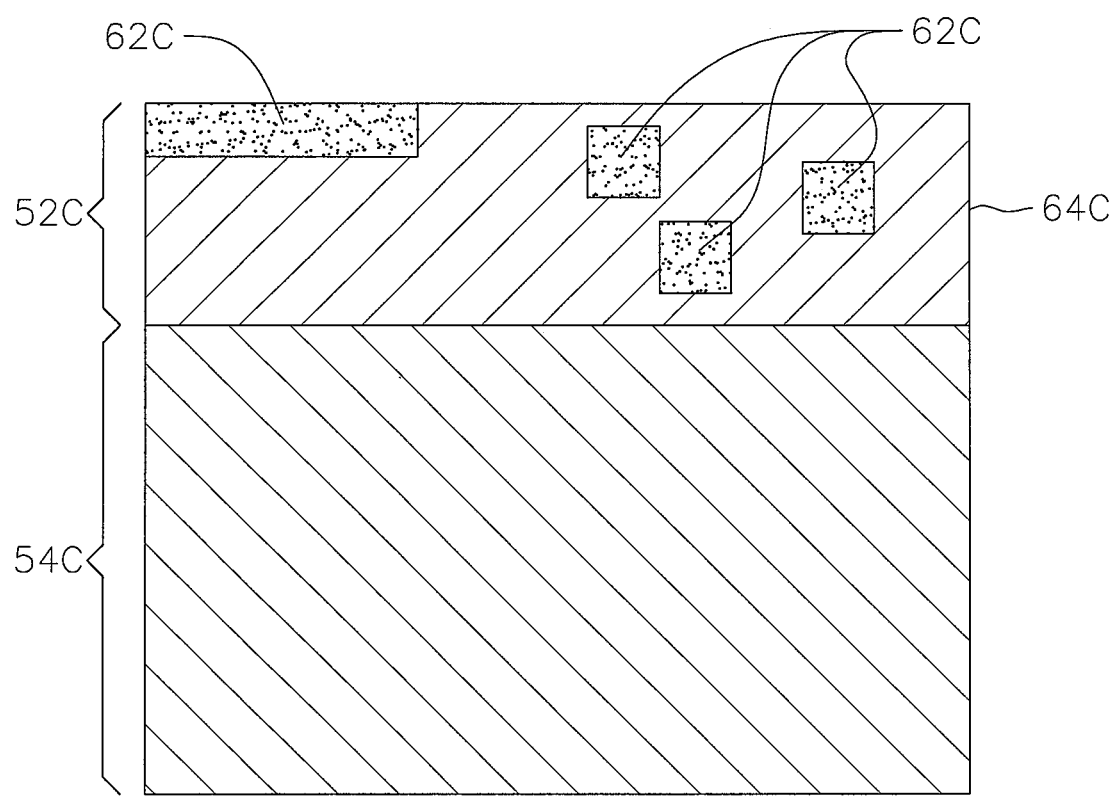

THERMALLY STABLE MATERIALS, CUTTER ELEMENTS WITH SUCH THERMALLY STABLE MATERIALS, AND METHODS OF FORMING THE SAME

CROSS-REFERENCE TO RELATED APPLICATION

This application is based upon and claims the benefit of U.S. Provisional Application Ser. No. 61/581,843, filed on Dec. 30, 2011, entitled "Cutter Element with Thermally Stable Material," to inventor J. Daniel Belnap, the disclosure of which in incorporated by reference herein in its entirety.

BACKGROUND

The present invention relates to thermally stable ultra-hard materials, and more particularly to a cutting element incorporating a thermally stable ultra-hard material, and methods for forming the same. Ultra-hard materials are often used in cutting tools and rock drilling tools. Polycrystalline diamond material is one such ultra-hard material, and is known for its good wear resistance and hardness. To form polycrystalline diamond, diamond particles are sintered at high pressure and high temperature (HPHT sintering) to produce an ultra-hard polycrystalline structure. A catalyst material is added to the diamond particle mixture prior to sintering and/or infiltrates the diamond particle mixture during sintering in order to promote the intergrowth of the diamond crystals during HPHT sintering, to form the polycrystalline diamond (PCD) structure. Metals conventionally employed as the catalyst are selected from the group of solvent metal catalysts selected from Group VIII of the Periodic table, including cobalt, iron, and nickel, and combinations and alloys thereof. After HPHT sintering, the resulting PCD structure includes a network of interconnected diamond crystals or grains bonded to each other, with the catalyst material occupying the interstitial spaces or pores between the bonded diamond crystals. The diamond particle mixture may be HPHT sintered in the presence of a substrate, to form a PCD compact bonded to the substrate. The substrate may also act as a source of the metal catalyst that infiltrates into the diamond particle mixture during sintering.

The amount of catalyst material used to form the PCD body represents a compromise between desired properties of strength, toughness, and impact resistance versus hardness, wear resistance, and thermal stability. While a higher metal catalyst content increases the strength, toughness, and impact resistance of the resulting PCD body, this higher metal catalyst content also decreases the hardness and wear resistance as well as the thermal stability of the PCD body. This trade-off makes it difficult to provide PCD having desired levels of hardness, wear resistance, thermal stability, strength, impact resistance, and toughness to meet the service demands of particular applications, such as in cutting and/or wear elements used in subterranean drilling devices.

Thermal stability is desired during wear or cutting operations. Conventional PCD bodies may be vulnerable to thermal degradation when exposed to elevated temperatures during cutting and/or wear applications. This vulnerability results from the differential that exists between the thermal expansion characteristics of the metal catalyst disposed interstitially within the PCD body and the thermal expansion characteristics of the intercrystalline bonded diamond. This differential thermal expansion is known to start at temperatures as low as 400° C., and can induce thermal stresses that are detrimental to the intercrystalline bonding of diamond and that eventually result in the formation of cracks that can make the PCD structure vulnerable to failure. Accordingly, such behavior is not desirable.

Another form of thermal degradation known to exist with conventional PCD materials is one that is also related to the presence of the metal catalyst in the interstitial regions of the PCD body and the adherence of the metal catalyst to the diamond crystals. Specifically, the metal catalyst is known to cause an undesired catalyzed phase transformation in diamond (converting it to carbon monoxide, carbon dioxide, or graphite) with increasing temperature, thereby limiting the temperatures at which the PCD body may be used.

To improve the thermal stability of the PCD material, the catalyst material may be removed from the PCD body after sintering, to form thermally stable PCD. This thermally stable PCD material (referred to as TSP) is formed by first HPHT sintering diamond particles in the presence of a metal catalyst, forming a PCD body with the catalyst occupying the interstitial regions between the diamond crystals. Then, the catalyst material is removed from the PCD body, leaving a network of empty interstitial spaces between the diamond crystals. For example, one known approach is to remove a substantial portion of the catalyst material from at least a portion of the sintered PCD by subjecting the sintered PCD construction to an acid leaching process, such as that disclosed for example in U.S. Pat. No. 4,224,380. Applying the leaching process to the PCD results in a thermally stable material portion substantially free of the catalyst material. If a substrate was used during the HPHT sintering, it is generally removed from the PCD body prior to leaching.

As another way to improve the thermal stability of the PCD material, a carbonate catalyst has been used to form the PCD. The carbonate catalyst is mixed with the diamond powder prior to sintering, and promotes the growth of diamond grains during sintering. When a carbonate catalyst is used, the diamond remains stable in polycrystalline diamond form with increasing temperature, rather than being converted to carbon dioxide, carbon monoxide, or graphite. Thus the carbonate PCD is more thermally stable than PCD formed with a metal catalyst.

As another way to provide a more thermally stable ultra-hard diamond, diamond bodies with high diamond content have been provided, by reducing the amount of catalyst material. Additionally, binderless polycrystalline diamond has been formed, without the use of a catalyst material. The resulting diamond material has a uniform intercrystalline diamond microstructure, without catalyst material interspersed between the diamond crystals. As a result, the binderless diamond body does not suffer from differential thermal expansion between diamond and catalyst.

However, while thermally stable diamond with a reduced amount of catalyst has high hardness and wear-resistance at elevated temperature, it is difficult to incorporate into a cutting element for use in a drilling or cutting tool. For example, binderless diamond material may be formed in small quantities, due to the specialized processes used in its formation. Bonding these small pieces of thermally stable diamond to other components of a cutting element can cause cracking, which can lead to early failure of the cutting element.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to thermally stable ultra-hard materials, and more particularly to a cutting element incorporating a thermally stable ultra-hard material, and methods for forming the same. In one embodiment, a thermally stable ultra-hard diamond element is provided, and is combined with a second ultra-hard material volume, such as a volume of diamond powder or an unsintered or pre-sintered diamond part. At least a surface of the thermally stable diamond element that face the second diamond volume are coated with a coating prior to combining the thermally stable diamond element with the second diamond volume. The assembly is then sintered at high pressure and high temperature to form PCD from the second diamond volume. During sintering, the coating at the interface between the thermally stable element and the second diamond volume melts. The melted coating acts as a slip plane between the two elements, allowing relative movement at the interface. This effect enables the second ultra-hard material volume to densify during sintering, shrinking relative to the more fully dense thermally stable ultra-hard element. As a result, the coating reduces the stresses along the interface and reduces cracking in the cutting element.

In one embodiment, a method for making an ultra-hard construction includes applying a coating on a surface of a thermally stable ultra-hard element. The thermally stable element has a theoretical density of at least 98% and a diamond volume content of at least 90%. The method also includes combining the thermally stable ultra-hard element with a second ultra-hard material volume to form an assembly. The coated surface of the thermally stable element faces the second ultra-hard material volume. The method also includes sintering the assembly at high pressure and high temperature. The thermally stable ultra-hard element is bonded to the sintered ultra-hard element to form an ultra-hard body having a working surface and/or a cutting edge. The thermally stable ultra-hard element forms at least a portion of the working surface or the cutting edge of the ultra-hard body. In one embodiment the thermally stable element has a theoretical density of at least 99%. In one embodiment the thermally stable element has a diamond volume content of at least 98%, and in another embodiment at least 99%.

BRIEF DESCRIPTION OF THE DRAWINGS

Embodiments of THERMALLY STABLE MATERIALS, CUTTER ELEMENTS WITH SUCH THERMALLY STABLE MATERIALS, AND METHODS OF FORMING THE SAME are described with reference to the following figures.

FIG. 2A illustrates a perspective view of a diamond construction incorporating a thermally stable diamond element, according to an embodiment.

FIG. 2B illustrates a perspective view of a diamond construction incorporating a thermally stable diamond element, according to an embodiment.

FIG. 2C illustrates a cross-sectional view of a diamond construction incorporating one or more thermally stable diamond elements, according to an embodiment.

DETAILED DESCRIPTION

The present disclosure relates to thermally stable ultra-hard materials, and more particularly to a cutting element incorporating a thermally stable ultra-hard material, and methods for forming the same. In one embodiment, a thermally stable ultra-hard diamond element is provided, and is combined with a second ultra-hard material volume, such as a volume of diamond powder or an unsintered or pre-sintered diamond part. One or more surfaces of the thermally stable diamond element that face the second diamond volume are coated with a coating prior to combining the thermally stable diamond element with the second diamond volume. The assembly is then sintered at high pressure and high temperature to form PCD from the second diamond volume. During sintering, the coating at the interface between the thermally stable element and the second diamond volume melts. The melted coating acts as a slip plane between the two elements, allowing relative movement at the interface. This effect enables the second ultra-hard material volume to densify during sintering, shrinking relative to the more fully dense thermally stable ultra-hard element. As a result, the coating reduces the stresses along the interface and reduces cracking in the cutting element.

For clarity, as used herein, the term "PCD" refers to conventional polycrystalline diamond that has been formed with the use of a metal catalyst during an HPHT sintering process, forming a microstructure of bonded diamond crystals with the catalyst material occupying the interstitial spaces or pores between the bonded diamond crystals. "Thermally stable PCD" (or "TSP") refers to PCD material which has been subsequently treated to substantially remove the catalyst material from at least a portion of the PCD body, such as by leaching the entire or part of the PCD body after HPHT sintering, to remove the catalyst material from the interstitial regions of the PCD body. "Binderless" diamond refers to a polycrystalline diamond matrix that is formed without the use of a metal catalyst, such as by converting graphite directly to diamond at ultra-high pressure and temperatures. This material is not referred to as PCD, in order to clarify that it does not utilize a metal catalyst, and to distinguish it from thermally stable PCD (TSP). This binderless diamond material may have a diamond volume content of at least 99%. Finally, "carbonate PCD" refers to PCD formed in the presence of a carbonate catalyst.

Embodiments of the present disclosure are directed to thermally stable ultra-hard materials with a theoretical density of at least 98% and a diamond volume content of at least 90%. This includes both TSP that has a diamond volume content of at least 98%, carbonate PCD with a diamond volume content of 90-95%, as well as binderless diamond material. These materials are referred to herein as "thermally stable diamond materials" or a "thermally stable diamond element."

Figure 1A:
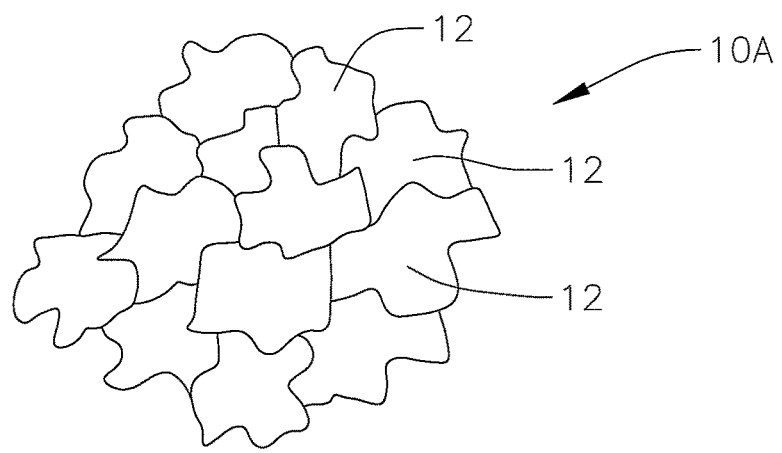
FIG. 1A illustrates a schematic view of a material microstructure of a thermally stable diamond material according to an embodiment (with dimensions exaggerated and not to scale, for clarity).

As described below, embodiments herein provide a thermally stable diamond material with a theoretical density of at least 98% and a diamond volume content of at least 90%. In one example, this thermally stable diamond material is a binderless diamond, formed through a process that does not utilize a metal catalyst material. A region of a binderless thermally stable diamond material 10A is schematically illustrated in FIG. 1A, according to an embodiment of the present disclosure. The thermally stable, binderless diamond material 10A has a polycrystalline microstructure including multiple diamond grains or crystals 12 bonded to each other. As shown in FIG. 1A, this material microstructure is substantially devoid of gaps or interstitial spaces between the diamond crystals 12. The diamond crystals 12 are bonded directly to each other. The binderless diamond material 10A is essentially pure carbon, with a diamond volume fraction of substantially 100%. There is substantially no binder phase or catalyst material between the diamond crystals 12.

This material is described as "substantially" devoid of gaps and interstitial spaces, and "substantially" 100% diamond, in order to allow for the possibility of small imperfections and deviations within the binderless diamond material 10A which may leave small gaps or spaces between some of the diamond crystals. In one embodiment the material microstructure of the binderless thermally stable diamond material has a diamond volume content of at least 98%, and in another embodiment at least or about 99%, and in another embodiment at least or about 99.5%, and in another embodiment at least or about 99.8%, and in another embodiment at least or about 99.9%. In one embodiment the thermally stable diamond material 10A has a fine diamond grain size, such as an average diamond grain size less than 1 micron, such as about 50 nm or less. In other embodiments the thermally stable diamond material has an average grain size of about 1-10 microns.

To form a binderless diamond material such as the material 10A shown in FIG. 1A, carbon, in the form of graphite, buckeyballs, or other carbon structures, is subjected to an ultra-high HPHT sintering process without a catalyst material. In one embodiment, this process includes HPHT sintering at ultra-high temperature and pressure, above that applied during conventional HPHT sintering to form PCD. In one embodiment, the pressure is between about 100-160 kbar, such as about 150 kbar, and the temperature is about 1600-2500° C. For example, when sintering graphite, the pressure may be about 150 kbar, or about 150-160 kbar. When sintering other types of carbon, such as buckeyballs or other complex carbon structures, the pressure may be about 110-120 kbar. For reference, conventional HPHT sintering to form PCD may be performed at about 50-60 kbar. In another embodiment, the temperature is about 2200-2300° C.

The method phase transforms the graphite (or other form of carbon) into polycrystalline diamond. That is, during the HPHT sintering process, the graphite converts into polycrystalline diamond, without the assistance of a catalyst material. Once the HPHT sintering is complete, the result is a thermally stable polycrystalline diamond matrix including bonded together diamond crystals substantially devoid of interstitial spaces, as discussed above.

In another embodiment, the thermally stable binderless diamond material 10A is formed by depositing layers in a chemical vapor deposition process, to form a thermally stable diamond element with substantially 100% diamond volume content.

The binderless diamond material 10A is inherently thermally stable, due to its uniform diamond content. The binderless diamond material 10A is one phase, and thus there is no differential thermal expansion between different phases of the material. As a result, diamond bodies formed from this thermally stable diamond material 10A can exhibit very high strength even at elevated temperatures, where conventional PCD suffers from thermal degradation due to the differential expansion of the diamond and catalyst phases.

Figure 1B:
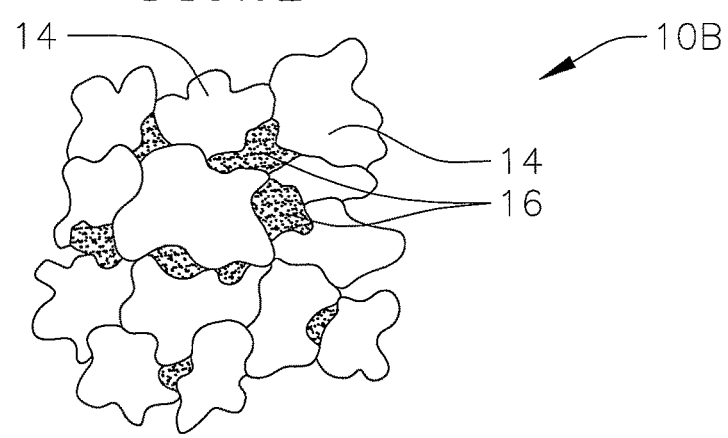
FIG. 1B illustrates a schematic view of a material microstructure of a thermally stable diamond material according to an embodiment (with dimensions exaggerated and not to scale, for clarity).

In another embodiment, a TSP material is provided as the thermally stable diamond material with a theoretical density of at least 98%. The TSP is made up of diamond and substantially empty interstitial spaces, providing a diamond volume content of at least 98%, and in another embodiment at least 99%. A region of a TSP material 10B having a diamond volume content of at least 98% is schematically illustrated in FIG. 1B. The TSP material 10B has a polycrystalline microstructure including multiple diamond grains or crystals 14 bonded to each other, with interstitial spaces or pores 16 between the diamond crystals. This polycrystalline microstructure is formed by first forming PCD and then removing the catalyst material from the interstitial spaces 16. That is, diamond powder is subjected at an HPHT sintering process in the presence of a metal catalyst. In one embodiment, the HPHT sintering process includes applying a pressure of about 50 kbar or greater, and a temperature of about 1,350 to 1,550° C. At this temperature and pressure, the catalyst material melts and infiltrates into the diamond powder mixture. The catalyst promotes the growth of diamond crystals during the HPHT sintering process, forming PCD. The result is a PCD material with the catalyst material occupying the interstitial spaces 16 between the diamond crystals 14. In one embodiment, the diamond grains in the PCD material are about 1-20 microns in size.

Subsequently, this catalyst material is removed, such as by subjecting the PCD material to a chemical treatment, such as acid leaching, aqua regia bath, electrochemical treatment, or liquid metal infiltration, or combinations of these. After removing the catalyst, the result is a TSP material 10B with interstitial spaces 16 that are substantially empty, as shown in FIG. 1B. This TSP material 10B has a diamond volume fraction of at least 98%, and in another embodiment at least 99%. In an another embodiment, a TSP material with a diamond volume fraction of at least 97% may be used.

The term "removed", as used with reference to the catalyst material removed from TSP, is understood to mean that a substantial portion of the catalyst material no longer resides within the treated region of the diamond body. However, it is to be understood that some small amount of catalyst material may still remain in the part, e.g., within the interstitial regions and/or adhered to the surface of the diamond crystals. Additionally, the term "substantially free", as used herein to refer to the catalyst material in the treated region of the diamond body, is understood to mean that there may still be some small/trace amount of catalyst material remaining within the treated diamond body as noted above.

Figure 1C:
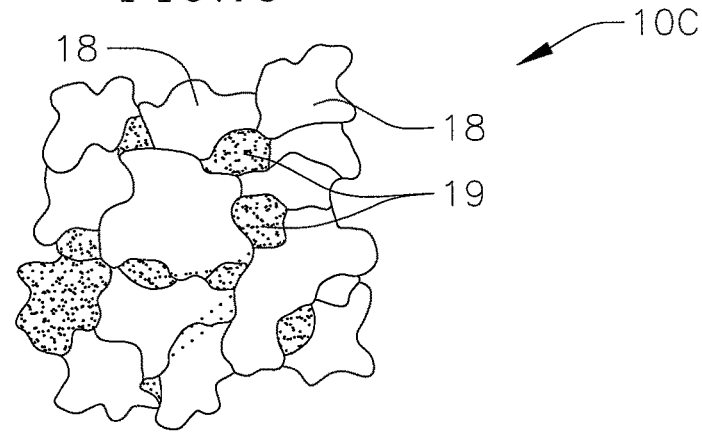
FIG. 1C illustrates a schematic view of a material microstructure of a thermally stable diamond material according to an embodiment (with dimensions exaggerated and not to scale, for clarity).

In another embodiment, a carbonate PCD material is provided as the thermally stable diamond material with a theoretical density of at least 98% and a diamond volume content of at least 90%. In one embodiment the carbonate PCD is made up of about 90-95% diamond (by volume), as well as carbonate catalyst material, providing a total theoretical density of at least 98%, and in another embodiment at least 99%. A region of a carbonate PCD material 10C having a theoretical density of at least 98% is schematically illustrated in FIG. 1C. The carbonate PCD material 10C has a polycrystalline microstructure including multiple diamond grains or crystals 18 bonded to each other, with interstitial spaces or pores between the diamond crystals. This polycrystalline microstructure is formed by subjecting a diamond powder to an HPHT sintering process in the presence of a carbonate catalyst. In one embodiment, the HPHT sintering process includes applying a pressure of about 65 kbar or greater, and a temperature of about 2000 to 2500° C. At this temperature and pressure, the carbonate catalyst material melts and infiltrates into the diamond powder mixture. The catalyst promotes the growth of diamond crystals during the HPHT sintering process, forming carbonate PCD. The result is a carbonate PCD material with the carbonate catalyst material 19 occupying the interstitial spaces between the diamond crystals 18. In one embodiment, the diamond grains 18 in the carbonate PCD material are about 1-20 microns in size, and provide a diamond volume content of at least 90%. In another embodiment the carbonate PCD has a diamond volume content of at least 95%. In one embodiment, the carbonate catalyst material is magnesium carbonate ($MgCO_3$)

The diamond materials 10A, 10B, and 10C are thermally stable diamond materials having a theoretical density of at least 98%, or higher, and a diamond volume content of at least 90%, or in another embodiment at least 95%. These materials show improved thermal stability as compared to conventional PCD and other forms of diamond with lower diamond volume content or lower theoretical density. In one embodiment, the thermally stable diamond element is expected to be thermally stable above 700° C., and in another embodiment above 750° C., and maintains high strength at elevated temperatures (for example, a strength of about 3.0 GPa above 1000° C.). In one embodiment, the thermally stable diamond matrix is expected to exhibit a hardness of about 4000 HV or greater.

In certain embodiments, to form the diamond materials 10A, 10B, or 10C, high temperatures and pressure are applied. Due to the high temperature and pressure used to form these thermally stable diamond materials, the materials may be formed in small quantities. The amount of space within a central pressure cell of a high-pressure press is limited, and in some cases just a small volume of material can be HPHT sintered in the press to form the thermally stable diamond material. It is then desirable to incorporate the small volume of thermally stable diamond material into a larger ultra-hard construction, such as a diamond construction, for use in a cutting tool.

According to an embodiment of the present disclosure, a method for forming an ultra-hard construction incorporating a thermally stable ultra-hard element is provided. In one embodiment, the method includes forming a diamond construction incorporating a thermally stable diamond element. In this method, the thermally stable diamond material (binderless diamond, carbonate PCD, or TSP, with a theoretical density of at least 98% and a diamond volume content of at least 90%) is formed, cut, or machined into a desired shape, forming a thermally stable diamond element. The thermally stable diamond element is then combined with a second ultra-hard material volume, such as a diamond volume, into a combined ultra-hard assembly. This combined assembly is subjected to a second HPHT sintering process to form a sintered ultra-hard body that incorporates the thermally stable ultra-hard element. Optionally, the combined assembly also includes a substrate, such that the ultra-hard body is bonded to the substrate during sintering. In one embodiment, the combined assembly includes a diamond body incorporating a thermally stable diamond element.

The thermally stable diamond element is combined with the second diamond volume in order to incorporate the thermally stable diamond element into a sintered diamond body that can be utilized in a cutting tool.

Figure 3A:
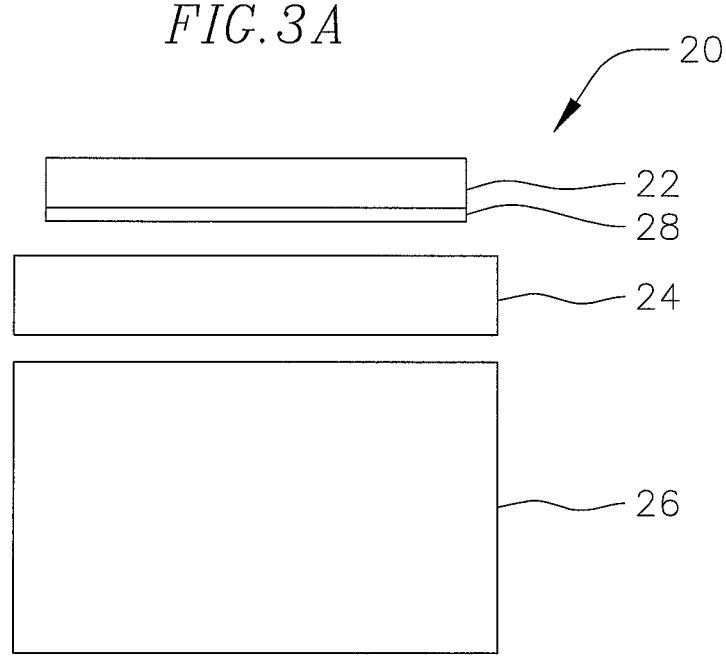
FIG. 3A illustrates a side view of an assembly including a thermally stable diamond element and a coating, prior to sintering of the assembly.

According to an embodiment of the disclosure, an ultra-hard assembly 20 prior to sintering is shown in FIG. 3A. The ultra-hard assembly 20 includes a thermally stable ultra-hard element 22, a second ultra-hard material volume 24, and a substrate 26. In this embodiment, each of these components is cylindrical in shape, stacked together with the second ultra-hard material volume 24 interposed between the thermally stable ultra-hard element 22 and the substrate 26. In one embodiment, the ultra-hard assembly 20 is a diamond assembly, including a thermally stable diamond element 22, a second diamond volume 24, and a substrate 26.

In an embodiment, the thermally stable diamond element 22 is a TSP material, carbonate PCD material, or binderless diamond material with a theoretical density of at least 98%, as described above. The second diamond volume 24 is a volume of diamond that is not fully densified. In one embodiment, the second diamond volume is a volume of diamond powder. Optionally, the diamond powder may include a catalyst material mixed with the diamond powder, to promote the formation of PCD from the diamond powder during sintering. In other embodiments, the second diamond volume may be an unsintered green-state part or volume, or a pre-sintered diamond body that is not fully densified. Prior to sintering, the second diamond volume includes diamond that has not yet been formed into a polycrystalline diamond structure. During sintering, this second diamond volume is converted into PCD.

The substrate 26 is useful for attaching the diamond body to a cutting tool. The substrate may also provide a source of a solvent metal catalyst for HPHT sintering. The substrate can be selected from the group including metallic materials, ceramic materials, cermet materials, and combinations thereof. Examples include carbides such as WC, W 2 C, TiC, VC, and SiC. In one embodiment, the substrate is formed of cemented tungsten carbide.

As discussed above, the thermally stable element may be formed during a first sintering process. The second diamond volume 24 and the comparatively dense thermally stable element 22 are both sintered together during a second sintering process, to incorporate them together into one sintered diamond body. However, the second diamond volume 24 and the thermally stable diamond element 22 undergo different amounts of densification during this second HPHT sintering process. The thermally stable diamond element is already substantially fully dense, having already undergone an HPHT sintering process to provide a theoretical density of 98% or higher. This element is substantially fully dense and does not undergo substantial additional densification during the second HPHT sintering process. By contrast, the second diamond volume 24 forming the remainder of the diamond body, such as a loose diamond powder, is not fully dense, and it undergoes major densification during the second HPHT sintering process. As a result, the second diamond volume 24 experiences shrinkage relative to the thermally stable element 22.

During sintering, the surface of the thermally stable element may constrain the shrinkage of the second diamond volume, making it difficult to achieve full densification of the second diamond volume at the interface with the thermally stable element. This can introduce stresses in the resulting diamond body at the interface between the thermally stable diamond element 22 and the PCD element formed from the second diamond volume 24. These stresses in the material can later cause cracks to form, leading to early failure of the diamond body.

Figure 3B:
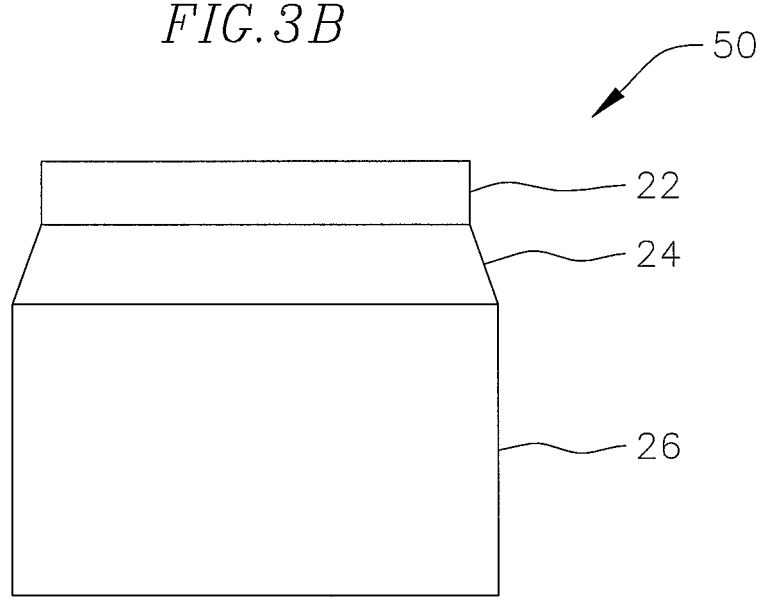
FIG. 3B illustrates a side view of the assembly of FIG. 3A after sintering.

According to an embodiment of the present disclosure, a coating 28 is provided between the thermally stable ultra-hard element 22 (such as the thermally stable diamond element 22) and the second ultra-hard material volume 24 (such as the second diamond volume 24) prior to the second HPHT sintering process. As the heat and pressure are applied during the second HPHT sintering process, the coating 28 melts into a liquid form. The liquid coating forms a slip plane between the thermally stable diamond element 22 and the second diamond volume 24, allowing the materials to shift relative to each other along the liquid plane. The materials can move relative to each other to accommodate shrinkage of the second diamond volume relative to the thermally stable element as the second diamond volume densifies. This freedom of relative movement during sintering reduces the stresses in the final diamond body. The assembly is shown after sintering as the sintered diamond construction 50 in FIG. 3B. After sintering, the second diamond volume 24' shifted along the slip plane created by the coating, and exhibits shrinkage with respect to the thermally stable diamond element 22. The second diamond volume 24' is indicated with a prime (') indication in FIG. 3B to show that it is now post-sintering. After sintering, the second diamond volume has been formed into a PCD element 24'. The PCD element 24' is bonded to both the thermally stable diamond element 22 and the substrate 26. In one embodiment, the diamond grains in the PCD element 24' are about 1-40 microns in size.

Referring again to FIG. 3A, the coating 28 is formed on the surface of the thermally stable diamond element 22 that faces the second diamond volume 24. During the sintering process, the coating 28 melts and liquefies. The melted, liquid coating spreads between the two diamond volumes and wets the two facing surfaces at the interface between them (see interface 66A in FIG. 2A, below). The coating is chosen from a material that has good wetting properties for wetting diamond, such as, for example, cobalt.

In this liquid form, a portion of the coating may move into the second diamond volume 24, as the second diamond volume is not yet fully dense. As a result, the material for the coating is chosen to be a material that is compatible with the formation of PCD in the second diamond volume 24. In one embodiment, the coating is cobalt, and in one embodiment, pure cobalt, without any additives or mixtures. The coating may be any solvent metal catalyst selected from Group VIII of the Periodic table, including cobalt, iron, nickel, combinations, and alloys thereof. In one embodiment the coating is chosen from the group of cobalt, nickel, and copper. In one embodiment, the coating is devoid of refractory metals (such as niobium or molybdenum), in order to minimize the formation of carbide in the PCD body 24'.

The coating 28 is separate from a catalyst that may also be provided to assist in sintering the second diamond volume 24. In one embodiment, a metal catalyst infiltrates into the second diamond volume 24 during sintering, such as from the substrate, and/or is provided and mixed within the second diamond volume 24 prior to sintering. This catalyst material melts and moves through the second diamond volume 24 during sintering, reaching the top of the second diamond volume at the interface with the coating 28. This catalyst material promotes the formation of PCD in the second diamond volume. In an embodiment, the coating 28 is chosen to have a melting temperature that is higher than the melting temperature of the catalyst. Thus, as heat is applied, the catalyst melts first and moves through the second diamond volume. The second diamond volume is then occupied by the melted catalyst, which prevents the coating from moving down into the second diamond volume when the coating melts. The prior-melted catalyst displaces the melted coating 28 and prevents the melted coating 28 from moving through the second diamond volume. In this case, the melted, liquid coating remains substantially in place between the two diamond volumes, which is beneficial for accomplishing its slip plane function.

In one embodiment, the coating 28 has a melting point that is higher or slightly higher than the melting point of the catalyst material that is used to promote the formation of PCD in the second diamond volume 24. As a result, the catalyst melts and begins to move through the second diamond volume before the coating melts. This difference in melting temperature can be obtained even when the coating and the catalyst are both cobalt, as the catalyst material is not pure cobalt. For example, when the catalyst is cobalt infiltrated from a tungsten carbide cobalt (WC—Co) substrate, the catalyst is a eutectic mix of cobalt, tungsten, and carbon, which has a melting point of about 1300° C. This melting point is lower than the melting point of pure cobalt, which is about 1500° C. Thus, the catalyst melts before the coating melts. It is noted that during sintering, the cobalt coating will actually melt at a temperature lower than 1500° C., because the coating will become mixed with the catalyst once the catalyst melts and infiltrates. Thus, sintering may still take place below 1500° C.

In one embodiment, the melted coating 28 may partially move into the second diamond volume 24 during sintering, but does not infiltrate the thermally stable element 22. As discussed above, the thermally stable diamond element 22 is already fully dense, with few or no interstitial spaces between the diamond crystals, leaving little or no room for the coating to flow into the thermally stable element. The coating material diffuses in substantially one direction, away from the thermally stable diamond element and into the second diamond volume, or stays substantially in place between the two diamond volumes. This behavior helps to maintain the thermal stability of the thermally stable element, as the coating material does not infiltrate into the thermally stable element and does not create a two-phase structure which could suffer from differential thermal expansion.

During sintering, the coating melts and wets the surface of the thermally stable diamond element, spreading out along the surfaces between the two facing diamond volumes. After the sintering process, when the diamond construction is cooled, the coating cools and provides a strong bond between the two diamond volumes along their facing surfaces. This bond is formed by the melting and cooling of the coating material, and does not rely on infiltration of the coating material into either diamond volume. In one embodiment, the coating remains substantially in place along the surfaces between the two diamond volumes, and does not infiltrate or penetrate substantially into either diamond volume. In one embodiment, the coating penetrates slightly into the second diamond volume. Additionally, in one embodiment, use of a solvent catalyst material such as cobalt, nickel, iron, or mixtures thereof as the coating may also promote some diamond bonding between the first and second diamond volumes, depending on sintering conditions and the degree of penetration of the coating into the second diamond volume.

When the sintering is complete, the sintered diamond body includes a region formed from the second diamond volume and a region formed from the thermally stable diamond element. The region formed from the second diamond volume has a substantially higher metal catalyst content than the region formed from the thermally stable element. Optionally, if a small or trace amount of the coating material has infiltrated into the thermally stable element, it may be removed by leaching.

The coating 28 may be applied by a sputter deposition process onto the surface or surfaces of the thermally stable diamond element 22 facing the second diamond volume 24. In one embodiment, the coating 28 is approximately 50-100 microns thick, prior to the sintering process. In one embodiment, rather than coating the thermally stable element, a separate disc of material may be inserted between the thermally stable element and the second diamond volume. In the case where the thermally stable element is a small piece fully submerged into the second diamond volume, the thermally stable element may be coated in three dimensions on each outside surface of the thermally stable diamond element facing the second diamond volume. In another embodiment, the coating may be applied to the second diamond volume, such as when the second diamond volume is provided in a partially compacted disc or tape.

In one embodiment, the coating 28 is selected to have a melting point above the melting point of the solvent catalyst alloy, but below the maximum temperature reached during sintering. In one embodiment, the coating is not highly reactive (an example of a highly reactive material is an alkaline earth metal). In one embodiment, the coating is not a strong carbide former. In addition to cobalt and nickel, other materials expected to be suitable as a coating include palladium and the lanthanide series of rare earth elements (such as gadolinium, terbium, dysprosium, holmium, erbium, lutetium, and thulium, although the maximum sintering temperature may be needed to be raised for several of these elements). Coating may be applied with any number of processes such as but not limited to electrochemical plating, electroless coating, sputtering, physical vapor deposition, or chemical vapor deposition. The melting points of these materials vary from 1300-1600° C.

A separate coating or an intermediate layer or disc may be included between the second diamond volume 24 and the substrate 26. Such a layer is optional, and is separate from the coating 28. The coating 28 is applied between the two diamond volumes that form the sintered diamond body.

Figure 4:
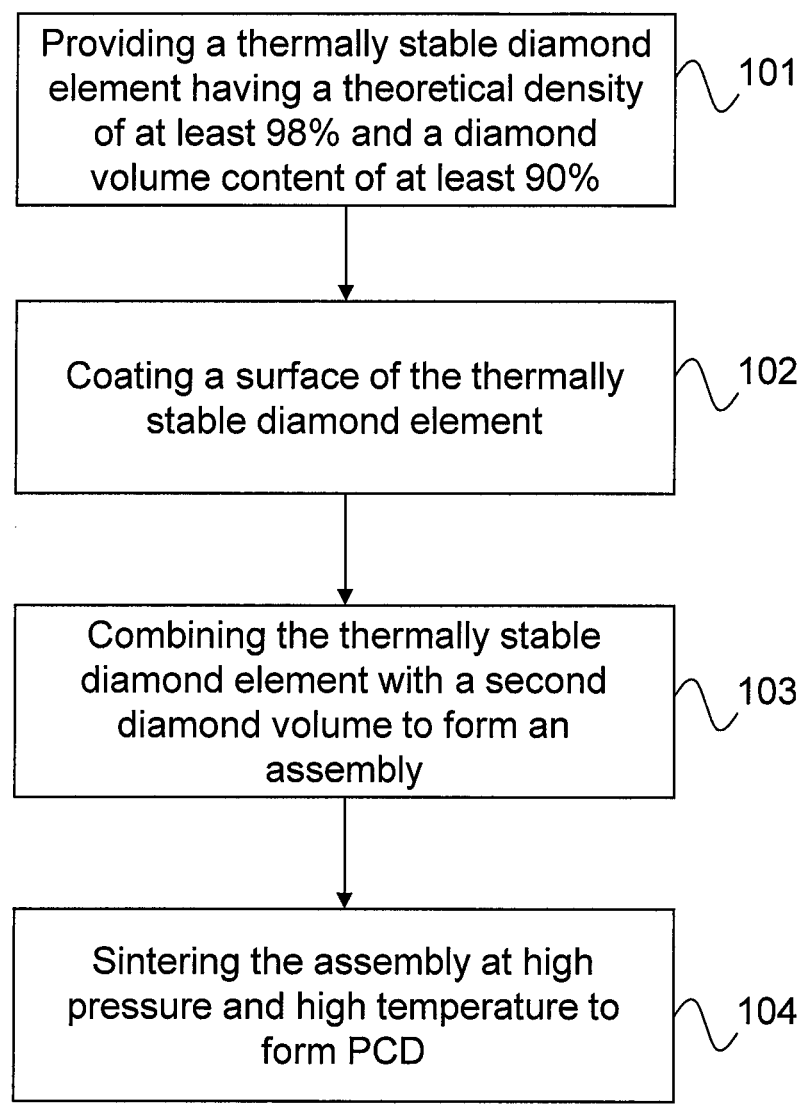
FIG. 4 illustrates a flowchart illustrating a method of forming a diamond construction incorporating a thermally stable diamond element, according to an embodiment.

FIG. 4 shows a flowchart illustrating a method of forming a diamond construction incorporating a thermally stable diamond element, according to an embodiment. In one embodiment, the method includes providing a thermally stable diamond element having a theoretical density of at least 98% and a diamond volume content of at least 90% (block 101), and coating a surface of the thermally stable diamond element (block 102). The method then includes combining the thermally stable diamond element with a second diamond volume to form an assembly (block 103). The coated surface of the thermally stable element faces the second diamond volume. The method then includes sintering the assembly at high pressure and high temperature to form PCD (block 104). The PCD is a polycrystalline diamond element formed from the second diamond volume. In one embodiment, sintering includes applying a pressure of about 50-60 kbar and a temperature of about 1,350 to 1,550° C. After sintering, the thermally stable diamond element is bonded to the polycrystalline diamond element to form a diamond body. The thermally stable diamond element forms at least a portion of the working surface and/or the cutting edge of the diamond body.

The above method forms a diamond construction incorporating a thermally stable diamond element. A diamond construction 50A according to an embodiment of the disclosure is shown in FIG. 2A. The diamond construction 50A includes a diamond body 52A bonded to a substrate 54A. The diamond body includes a working surface 56A opposite the substrate, and a cutting edge 58A at an edge of the working surface. The diamond body 52A meets the substrate 54A at an interface 60A, where the two facing surfaces of the diamond body and the substrate meet.

According to embodiments of the present disclosure, the diamond body 52A includes two regions—a thermally stable region (formed from the thermally stable diamond element) and a PCD region (formed from the second diamond volume). The thermally stable region includes a thermally stable diamond element 62A, and the PCD region includes a PCD element 64A. The two elements 62A, 64A meet each other at an interface 66A, defined by the facing surfaces of the two elements 62A, 64A. In one embodiment, the thermally stable diamond element 62A forms at least part of the cutting edge 58A and/or the working surface 56A of the diamond body 52A.

In FIG. 2A, the two elements 62A and 64A are shaped as discs or cylinders, with the thermally stable diamond element 62A stacked on top of the PCD element 64A. The thermally stable diamond element 62A substantially covers the entire top surface of the PCD element 64A. The PCD element 64A is positioned between the thermally stable diamond element 62A and the substrate 54A, such that the thermally stable element 62A does not contact the substrate. However, in other embodiments, the thermally stable diamond element and PCD element may have other shapes and configurations.

For example, in FIG. 2B, a diamond construction 50B includes a diamond body 52B with a thermally stable diamond element 62B that is shaped as a wedge or pie-shaped piece, and a mating PCD element 64B. The diamond body 52B meets the substrate 54B at an interface 60B, where the two facing surfaces of the diamond body and the substrate meet. The diamond body 52B includes a working surface 56B opposite the substrate 54B, and a cutting edge 58B at an edge of the working surface 56B. The two elements 62B, 64B meet at an interface 66B that is defined by the mating surfaces of the two elements. In this case, the side surfaces of the wedge-shaped piece 62B (along the interface 66B) face the PCD element 64B, and these surfaces are coated with the coating prior to the second sintering process. The coated wedge-shaped piece 62B is then combined with diamond powder to form the desired shape of the body 52B, and the combined assembly is sintered (optionally, with the substrate 54B). The thermally stable diamond element 62B forms a portion of the cutting edge 58B of the diamond body 52B, along the portion of the circumference spanned by the angle α.

Other configurations and shapes may be used in other embodiments. For example, the thermally stable diamond element may be formed into pieces of desired size and shape such as individual granules, particles, segments or the like, or may be formed into pieces of random shapes and sizes. The pieces may then be incorporated into the diamond body and may be fully surrounded by the PCD body. Another example is shown in FIG. 2C, showing a cross-sectional view of a diamond construction 50C according to an embodiment. The diamond construction 50C includes a diamond body 52C bonded to a substrate 54C. The diamond body 52C includes one or more thermally stable diamond elements 62C embedded within a PCD element 64C. The thermally stable elements may be fully submerged within the PCD element, or may form part of the exposed working surface, cutting edge, or side surface. In this embodiment, each of the surfaces of the thermally stable element that face the PCD element is coated as described herein.

The diamond constructions shown in FIGS. 2A-2C include a diamond body that incorporates a thermally stable diamond element to form at least a portion of the cutting edge or working surface of the diamond body. The remainder of the diamond body is formed by a PCD element formed from the second diamond volume 24 (see FIGS. 3A-3B). The PCD element facilitates the incorporation of the thermally stable element into the diamond body and the bonding of the diamond body to the substrate (if a substrate is utilized). In one embodiment, the thermally stable element forms at least a part of the working surface and/or the cutting edge of the diamond body, such as at least 5% of the cutting edge (as measured by the circumference of the diamond body).

In one embodiment, the thermally stable diamond element 62A, 62B is smaller than the PCD element 64A, 64B. That is, the thermally stable diamond element occupies less than half of the volume of the sintered diamond body. In one embodiment, the diamond volume content of the thermally stable diamond element is greater than that of the PCD element. For example, the thermally stable diamond element may have a diamond volume content of at least 95%, and in another embodiment at least 98%. The PCD element may have a diamond volume content of less than 95%, for example, ranging from 85% up to but less than 95%.

After sintering, the second diamond volume forms a PCD body that incorporates the thermally stable diamond element. In one embodiment, when the coating is a metal catalyst, it melts during sintering and partially infiltrates into the second diamond volume. As a result, after sintering, the coating may be dissipated into the second diamond volume and difficult to detect. There may be a higher content of this catalyst metal in the region near the coating than remote from the coating. When the coating is a different material than the catalyst used to form PCD, such as aluminum or copper, the sintered PCD body may show a residual amount of this material near the interface with the thermally stable element. Accordingly, in one embodiment the PCD element includes a higher level of the coating material near the interface with the thermally stable element than remote from the interface (such as near the substrate).

In an embodiment, the coating remains substantially in place between the two diamond volumes during sintering. After sintering, this coating can be detected as a coating layer spread along the facing surfaces of the two diamond volumes.

Figure 5:
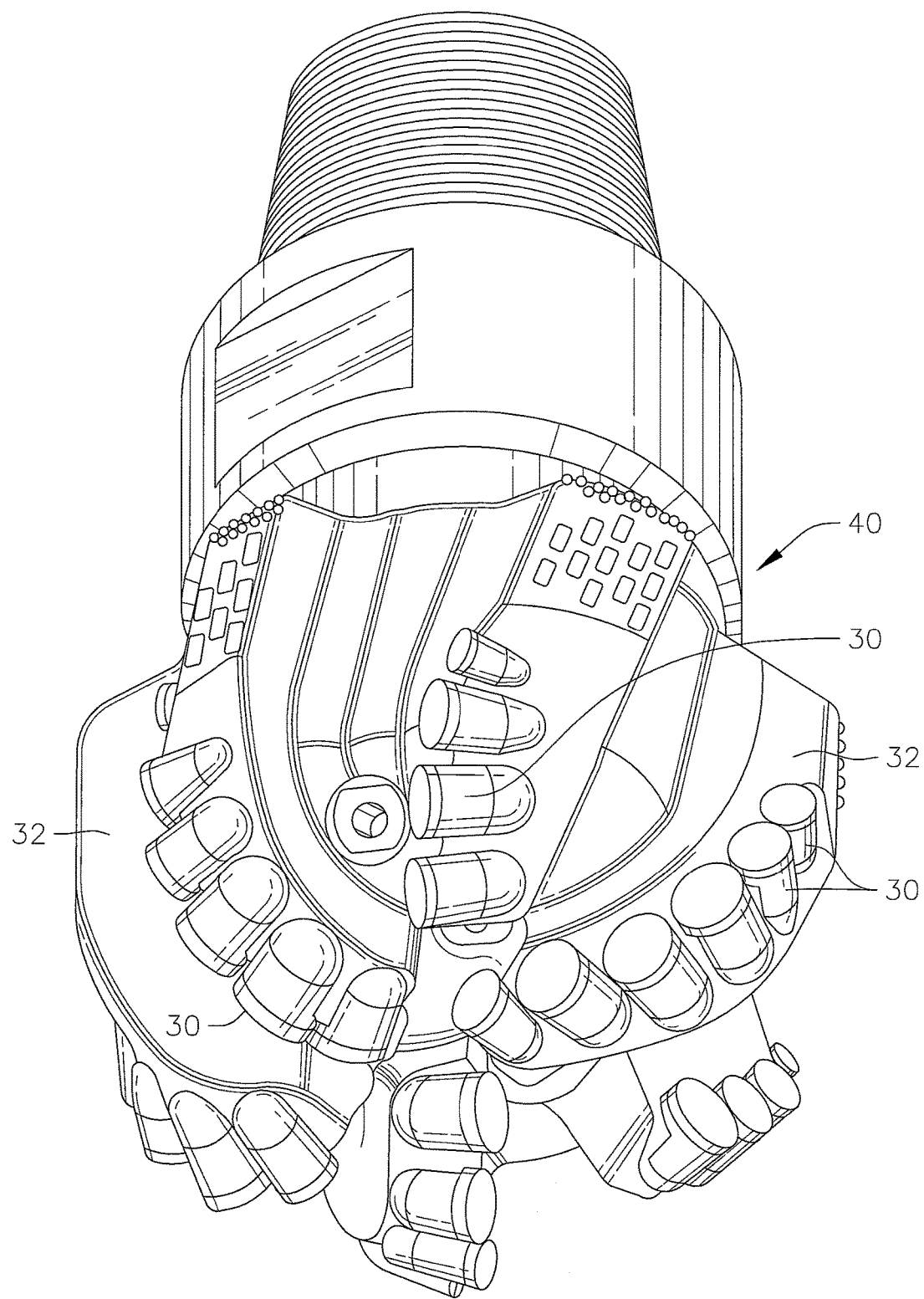
FIG. 5 illustrates a perspective view of a drag bit incorporating the cutting element of FIG. 3B.

The diamond constructions 50A, 50B shown in FIGS. 2A-2B are formed as cutting elements for incorporation into a cutting tool. FIG. 5 shows a drag bit 40 incorporating the cutting element of FIG. 2A, 2B, or 3B, according to an embodiment of the disclosure. The drag bit 40 may include several cutting elements 30 that are each attached to blades 32 that extend along the drag bit. The drag bit may be used for high-temperature rock drilling operations. In other embodiments, other types of drilling or cutting tools incorporate cutting elements that have a thermally stable diamond element forming at least a portion of the cutting edge of the cutting element, such as, for example, rotary or roller cone drilling bits, or percussion or hammer drill bits. In one embodiment, the cutting element is a shear cutter.

Diamond constructions manufactured according to the methods disclosed herein are expected to display an improved yield with reduced cracking. The interface between the PCD element and the thermally stable diamond element exhibits a reduction in cracks propagating through the PCD, as such cracks have been noted in PCD formed in the presence of a fully dense thermally stable ultra-hard element. In one embodiment, the polycrystalline diamond element exhibits shrinkage at the interface with the thermally stable element and is substantially devoid of cracks at the interface.

While the thermally stable element and the PCD body have been described above as a diamond bonded body, it is to be understood that these elements may be formed from ultra-hard materials other than diamond. As used herein, the term "ultra-hard" is understood to refer to those materials known in the art to have a grain hardness of about 4,000 HV or greater. Such ultra-hard materials may include those capable of demonstrating physical stability at temperatures above about 750° C., and for certain applications above about 1,000° C., that are formed from consolidated materials. Such ultra-hard materials may include but are not limited to diamond, cubic boron nitride (cBN), diamond-like carbon, boron suboxide, aluminum manganese boride, and other materials in the boron-nitrogen-carbon phase diagram which have shown hardness values similar to cBN and other ceramic materials.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the application not to invoke 35 U.S.C. § 112, paragraph 6 for any limitations of any of the claims herein, except for those in which the claim expressly uses the words 'means for' together with an associated function.

What is claimed is:

1. A method for making an ultra-hard construction comprising:
   applying a coating on a surface of a thermally stable ultra-hard element having a theoretical density of at least 98%, wherein the coating comprises a metal solvent catalyst;
   combining the thermally stable ultra-hard element with a second ultra-hard material volume to form an assembly, with the coated surface of the thermally stable element facing the second ultra-hard material volume; and
   sintering the assembly at high pressure and high temperature wherein the coating melts to form a slip plane during said sintering allowing the thermally stable ultra-hard element to shift relative to the second ultra-hard material volume during sintering;
   wherein sintering the assembly comprises sintering the second ultra hard material volume in the presence of a catalyst material to promote the formation of a sintered ultra-hard element, and wherein the coating comprises a melting temperature that is higher than a melting temperature of the catalyst material, wherein during sintering the melted coating remains substantially between the thermally stable ultra-hard element and the second ultra-hard material volume, wherein the thermally stable ultra-hard element is bonded to the sintered ultra-hard element to form an ultra-hard body having a working surface and/or a cutting edge, and wherein the thermally stable ultra-hard element forms at least a portion of the working surface and/or the cutting edge of the ultra-hard body.

2. The method of claim 1, wherein the thermally stable ultra-hard element is a thermally stable diamond element having a diamond volume content of at least 90%.

3. The method of claim 2, further comprising melting the coating during the sintering.

4. The method of claim 2, wherein the thermally stable diamond element comprises a material microstructure comprising bonded-together diamond crystals substantially devoid of interstitial regions between the diamond crystals and has a diamond volume content of at least 98%.

5. The method of claim 4, further comprising forming the thermally stable diamond element by phase-transforming graphite into diamond during a first high pressure high temperature sintering process at a temperature of about 1600-2500° C. and a pressure of about 100-160 kbar, prior to sintering the assembly.

6. The method of claim 2, further comprising forming the thermally stable diamond element by sintering a mixture of diamond particles in the presence of a carbonate catalyst material to form a material microstructure comprising bonded-together diamond crystals and interstitial spaces between the diamond crystals, with the carbonate catalyst material residing in the interstitial spaces.

7. The method of claim 2, wherein the thermally stable diamond element has a diamond volume content of at least 95%.

8. The method of claim 1, further comprising shrinking the second ultra-hard volume relative to the thermally stable ultra-hard element during the sintering.

9. The method of claim 1, further comprising infiltrating the coating in substantially one direction into the second ultra-hard material volume and away from the thermally stable element during sintering.

10. The method of claim 1, further comprising mounting the ultra-hard construction on a bit body.

11. The method of claim 1, wherein the melting temperature of the coating is below the maximum temperature reached during sintering.

12. The method of claim 1, wherein said bond is formed during cooling of said melted coating.

13. The method of claim 1, wherein the coating comprises at least one of a cobalt, iron, or nickel and combinations thereof.

14. A method for making a diamond construction comprising:

applying a coating on a surface of a thermally stable diamond element having a theoretical density of at least 98% and a diamond volume content of at least 90%;

combining the thermally stable diamond element with a second diamond volume to form an assembly, with the coated surface of the thermally stable element facing the second diamond volume, wherein the second diamond volume comprises a diamond powder, and wherein the coating comprises a metal solvent catalyst;

sintering the assembly at high pressure and high temperature in the presence of a catalyst material to form a polycrystalline diamond element from the diamond powder, wherein sintering comprises melting the catalyst material;

melting the coating during the sintering, wherein the coating melts after the catalyst material melts, and wherein melting the coating comprises forming a slip plane between the thermally stable diamond element and the second diamond volume during the sintering, allowing the thermally stable element and the second diamond volume to shift relative to each other along the melted coating forming the slip plane, wherein during sintering the melted coating remains substantially between the thermally stable diamond and the second diamond volume; and cooling the coating to bond the polycrystalline diamond element to the thermally stable diamond element to form a diamond body having a working surface and/or a cutting edge, wherein the thermally stable diamond element forms at least a portion of the working surface or the cutting edge of the diamond body.

15. The method of claim 14, further comprising mounting the diamond construction on a bit body.

16. The method of claim 14, wherein the coating comprises a material having a melting point above the melting point of the catalyst material and below the maximum temperature reached during sintering.

* * * * *